United States Patent
Min et al.

(10) Patent No.: US 12,185,303 B2
(45) Date of Patent: Dec. 31, 2024

(54) APPARATUS, SYSTEM AND METHOD OF TRIGGER-BASED (TB) MULTI-USER (MU) UPLINK (UL) ORTHOGONAL-FREQUENCY-DIVISION-MULTIPLE-ACCESS (OFDMA) CONTROL FRAME TRANSMISSION

(71) Applicant: INTEL CORPORATION, Santa Clara, CA (US)

(72) Inventors: Alexander W. Min, Portland, OR (US); Rath Vannithamby, Portland, OR (US); Arjun Anand, Santa Clara, CA (US); Vinod Kristem, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 556 days.

(21) Appl. No.: 16/583,623

(22) Filed: Sep. 26, 2019

(65) Prior Publication Data

US 2020/0022166 A1 Jan. 16, 2020

(51) Int. Cl.
*H04L 12/00* (2006.01)
*H04B 17/336* (2015.01)
(Continued)

(52) U.S. Cl.
CPC ...... *H04W 72/1268* (2013.01); *H04B 17/336* (2015.01); *H04L 5/0007* (2013.01); *H04W 88/08* (2013.01)

(58) Field of Classification Search
None
See application file for complete search history.

(56) References Cited

U.S. PATENT DOCUMENTS 10,972,196 B1 * 4/2021 Chu .................. H04B 17/27
11,050,589 B1 * 6/2021 Roy .................. H04L 5/0091
(Continued)

FOREIGN PATENT DOCUMENTS

WO    WO-2018187145 A1 * 10/2018 .......... G01S 13/765

OTHER PUBLICATIONS

IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.
(Continued)

*Primary Examiner* — Noel R Beharry
*Assistant Examiner* — Lionel Preval
(74) *Attorney, Agent, or Firm* — Shichrur & Co.

(57) ABSTRACT

For example, a wireless communication device may be configured to, based on a grouping criterion, select from a plurality of STAs a group of two or more STAs for a Trigger-Based (TB) Multi-User (MU) UL OFDMA control frame transmission to be communicated from the group of two or more STAs to the wireless communication device, the grouping criterion based on two or more RSSI values corresponding to the two or more STAs, respectively; to transmit a trigger frame to trigger the TB MU UL OFDMA control frame transmission, the trigger frame including two or more STA Identifiers to identify the two or more STAs, respectively; and to process the TB MU UL OFDMA control frame transmission from the group of two or more STAs, the TB MU UL OFDMA control frame transmission including two or more control frames from the two or more STAs, respectively.

21 Claims, 4 Drawing Sheets

(51) Int. Cl.
*H04L 5/00* (2006.01)
*H04W 72/1268* (2023.01)
*H04W 88/08* (2009.01)

(56) References Cited

U.S. PATENT DOCUMENTS

| | | | |
|---|---|---|---|
| 2018/0205441 A1* | 7/2018 | Asterjadhi | H04W 74/06 |
| 2019/0052428 A1* | 2/2019 | Chu | H04W 8/005 |
| 2019/0159220 A1* | 5/2019 | Elsherif | H04W 72/12 |
| 2019/0230674 A1* | 7/2019 | Cheng | H04L 5/0007 |
| 2019/0268850 A1* | 8/2019 | Kim | H04W 74/0833 |
| 2020/0037183 A1* | 1/2020 | Ganu | H04W 52/367 |
| 2020/0084786 A1* | 3/2020 | Sethi | H04W 74/004 |
| 2020/0137772 A1* | 4/2020 | Inohiza | H04W 72/1284 |
| 2020/0287633 A1* | 9/2020 | Silverman | H04B 17/318 |
| 2020/0322105 A1* | 10/2020 | Chitrakar | H04L 1/1685 |

OTHER PUBLICATIONS

IEEE P802.11ax/D4.0 Draft Standard for Information technology—Tele communications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, Feb. 2019, 746 pages.

\* cited by examiner

APPARATUS, SYSTEM AND METHOD OF TRIGGER-BASED (TB) MULTI-USER (MU) UPLINK (UL) ORTHOGONAL-FREQUENCY-DIVISION-MULTIPLE-ACCESS (OFDMA) CONTROL FRAME TRANSMISSION

TECHNICAL FIELD

Embodiments described herein generally relate to Trigger-Based (TB) Multi-User (MU) Uplink (UL) Orthogonal-Frequency-Division-Multiple-Access (OFDMA) control frame transmission.

BACKGROUND

An Access Point (AP) and a plurality of wireless communication stations (STAs) may be configured to implement Trigger-Based (TB) Multi-User (MU) Uplink (UL) Orthogonal Frequency Division Multiple Access (OFDMA) transmissions.

The procedure of the TB MU UL OFDMA transmissions may be configured to trigger UL data frames and/or to solicit various reports and/or control frames from the STAs to the AP.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
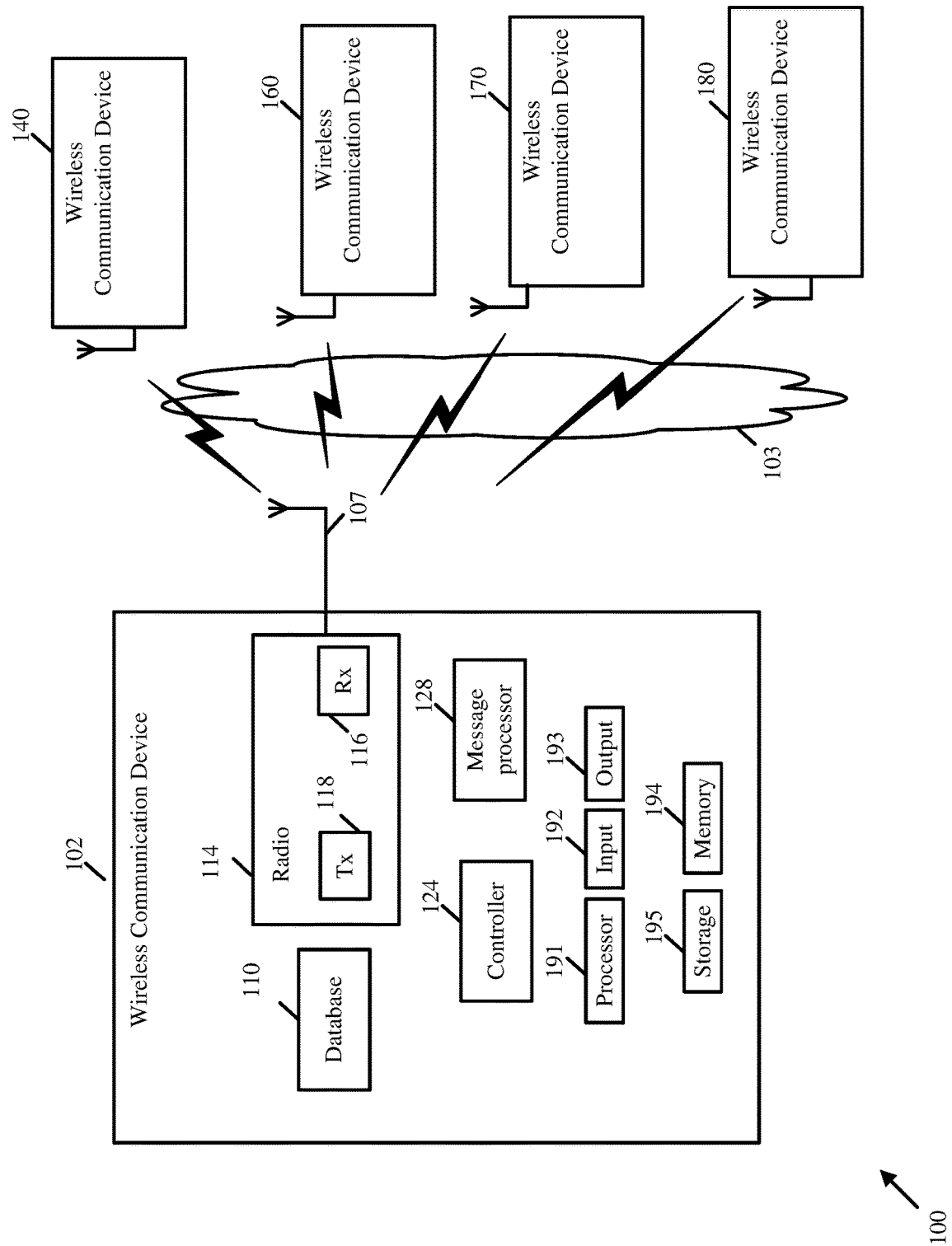
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (IEEE 802.11-2016, *IEEE Standard for Information technology—Telecommunications and information exchange between systems Local and metropolitan area networks—Specific requirements Part 11: Wireless LAN Medium Access Control (MAC) and Physical Layer (PHY) Specifications*, Dec. 7, 2016), and IEEE 802.11ax (*IEEE P802.11ax/D4.0 Draft Standard for Information technology—Tele-communications and information exchange between systems Local and metropolitan area networks Specific requirements, Part 11: Wireless LAN Medium Access Control (MAC) and Physical Layer (PHY) Specifications, Amendment 1: Enhancements for High Efficiency WLAN*, February, 2019)); and/or future versions and/or derivatives thereof, devices and/or networks operating in accordance with existing WFA Peer-to-Peer (P2P) specifications (including Wi-Fi P2P technical specification, version 1.5, Aug. 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a Wi-Fi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a Wi-Fi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative embodiments are described herein with respect to Wi-Fi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 140, 160, 170 and/or 180.

In some demonstrative embodiments, wireless communication devices 102, 140, 160, 170 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160, 170 and/or 180 may include, operate as, and/or perform the functionality of one or more STAs. For example, devices 102, 140, 160, 170 and/or 180 may include at least one STA.

In some demonstrative embodiments, devices 102, 140, 160, 170 and/or 180 may include, operate as, and/or perform the functionality of one or more WLAN STAs.

In some demonstrative embodiments, devices 102, 140, 160, 170 and/or 180 may include, operate as, and/or perform the functionality of one or more Wi-Fi STAs.

In some demonstrative embodiments, devices 102, 140, 160, 170 and/or 180 may include, operate as, and/or perform the functionality of one or more BT devices.

In some demonstrative embodiments, devices 102, 140, 160, 170 and/or 180 may include, operate as, and/or perform the functionality of one or more Neighbor Awareness Networking (NAN) STAs.

In some demonstrative embodiments, one or more of wireless communication devices 102, 140, 160, 170 and/or 180, e.g., devices 102, may include, operate as, and/or perform the functionality of an Access Point (AP) STA.

For example, the AP may include a router, a PC, a server, a Hot-Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of one or more of device 102 may be enclosed in a common housing or packaging, and may be interconnected or operably associated using one or more wired or wireless links. In other embodiments, components of one or more of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, wireless communication devices 102, 140, 160, 170 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wi-Fi channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, a Sub-1 GHz (S1G) band, and/or any other frequency band.

In some demonstrative embodiments, devices 102, 140, 160, 170 and/or 180 may include one or more radios including circuitry and/or logic to perform wireless communication between devices 102, 140, 160, 170 and/or 180, and/or one or more other wireless communication devices. For example, device 102 may include a radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 may include or may be implemented as part of a wireless Network Interface Card (NIC), and the like.

In some demonstrative embodiments, radio 114 may be configured to communicate over a 2.4 GHz band, a 5 GHz band, an mmWave band, a S1G band, and/or any other band.

In some demonstrative embodiments, radio 114 may include, or may be associated with, one or more antennas 107.

In one example, device 102 may include a single antenna 107. In another example, device may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, antennas 107 may include a phased array antenna, a multiple element antenna, a set of switched beam antennas, and/or the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 180, and/or one or more other devices, e.g., as described below.

In some demonstrative embodiments, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124, respectively. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 124 may be implemented as part of one or more elements of radio 114.

In other embodiments, the functionality of controller 124 may be implemented as part of any other element of device 102.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative embodiments, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, wireless communication devices 102, 140, 160, 170 and/or 180 may form, or may communicate as part of, a wireless local area network (WLAN).

In some demonstrative embodiments, wireless communication devices 102, 140, 160, 170 and/or 180 may form, or may communicate as part of, a Wi-Fi network.

In other embodiments, wireless communication devices 102, 140, 160, 170 and/or 180 may form, and/or communicate as part of, any other additional or alternative network.

In some demonstrative embodiments, device 102 may include, operate as, perform the role of, and/or perform one or more functionalities of an AP STA.

In some demonstrative embodiments, devices 102, 140, 160, 170 and/or 180 may include, operate as, perform the role of, and/or perform one or more functionalities of, one or more STAs. For example, devices 102, 140, 160, 170 and/or 180 may include at least one STA.

In some demonstrative embodiments, there may be a need to address one or more inefficiencies, disadvantages and/or technical problems in one or more use cases and/or scenarios, for example, with usage of one or more IEEE802.11 Standards, standards enhancements, or any other Standards, for example, for simultaneous UL transmissions from multiple STAs, e.g., as described below.

In some demonstrative embodiments, devices 102, 140, 160, 170 and/or 180 may be configured to implement Trigger-Based (TB) Multi-User (MU) Uplink (UL) Orthogonal Frequency Division Multiple Access (OFDMA) transmissions, for example, in accordance with an IEEE802.11ax Standard, e.g., as described below.

In some demonstrative embodiments, the TB MU UL OFDMA transmissions may be configured to trigger transmission of data frames and/or to solicit transmission of control frames, e.g., including one or more report frames, for example, from a plurality of wireless communication stations (STAs), e.g., devices 140, 160, 170 and/or 180, to an AP, e.g., device 102.

In some demonstrative embodiments, the control frames may include, for example, Buffer Status Report (BSR) frames, Beamforming Report (BFR) frames, Bandwidth Query Report (BQR) frames, Null Data Packet (NDP) Feedback Report (NFR) frames, and/or any other additional or alternative frames.

In one example, the AP may schedule transmission of BSR and/or NFR frames from the plurality of STAs, e.g., including associated STAs in a Basic Service Set (BSS), for example, to identify a set of STAs, for example, with data for uplink transmissions.

In some demonstrative embodiments, for example, in some use cases, scenarios, and/or implementations, it may be efficient and/or advantageous to configure an AP, e.g., device 102, to define one or more UL groups, for example, for efficient TB MU UL OFDMA transmissions, e.g., to reduce or minimize an amount of padding, for example, in an UL OFDMA PPDU, e.g., as described below.

In some demonstrative embodiments, device 102 may be configured to form groups of UL STAs for transmission of TB MU UL report frames in a TB MU UL OFDMA transmission, for example, based on one or more metrics, for example, while reducing, e.g., minimizing, an overall MAC-layer overhead, e.g., as described below.

In one example, the one or more metrics may include metrics, which may be available and/or measurable at the AP, for example, a Received Signal Strength Indicator (RSSI) and/or the like, e.g., as described below. In other embodiment, In another example, any other additional or alternative metrics may be implemented.

In some demonstrative embodiments, lack of UL grouping algorithms or sub-optimal algorithms to form groups of UL STAs for the TB MU UL OFDMA transmission may result in performance degradation, e.g., reduced throughput performance and/or increased MAC overhead for the TB MU UL transmissions.

In some demonstrative embodiments, it may be advantageous to define a detailed mechanism for UL STA grouping for the TB MU UL transmissions, for example in addition to a TB MU UL procedure and/or various types of trigger-based reporting mechanisms, e.g. a BSR Poll (BSRP), a BFR Poll (BFRP), an NFR Poll (NFRP), and/or the like, for example, according to the IEEE 802.11ax Standard.

In some demonstrative embodiments, reusing UL data groups, which are configured for UL data transmissions, for the TB MU UL transmissions of control frames, may be disadvantageous and/or inefficient. For example, the UL data groups may be formed, for example, based on a set of requirements, e.g., for data, which may be different from the requirements for TB MU UL reports.

In some demonstrative embodiments, an AP, e.g., device 102, may be configured to group STAs for uplink transmissions ("UL STAs") based on a grouping criterion, for example, based on RSSI values, e.g., based on similar RSSI values. For example, grouping the STAs according to the grouping criterion may allow the AP to use a similar Modulation and Coding Scheme (MCS) configuration for the UL STAs within the group, e.g., as descried below.

In one example, the AP may measure RSSI values, e.g., from previous UL transmissions, and may store the RSSI values, e.g., for each STA, in a database, e.g., a local database of the AP, or any other remote or local database.

In some demonstrative embodiments, an AP, e.g., device 102, may be configured to group the STAs, for example, based on any other additional or alternative metrics, for example, Quality of Service (QoS) requirements, a frequency of UL scheduling, a size of a BFR frame, e.g., when triggering BFR frames, frequency selective fading channel information, for example, stored in the local database, and/or any other additional and/or alternative metrics, e.g., as descried below.

In some demonstrative embodiments, grouping STAs based on the RSSI values, may allow the AP to define, e.g., to quickly define, UL groups, for example, based on stored RSSI values, e.g., in the local database, for example, even without any additional overhead, e.g., even without probing. For example, grouping the STAs based on the RSSI values may allow the AP to identify a group of STAs having a similar performance, e.g., MCS, for example, based on the RSSI values. For example, identifying a group of STAs having a similar MCS may be useful, for example, when the AP triggers report frames of the same frame size, e.g., as this may allow to reduce, e.g., minimize, an amount of zero padding within a PPDU.

In some demonstrative embodiments, grouping the STAs based on the RSSI values may be simple, and may allow an AP to dynamically update UL groups based on up-to-date statistics in the local database, e.g., with respect to the RSSI values.

In some demonstrative embodiments, device 102 may be configured to group two or more STAs from devices 140, 160, 170 and/or 180 into one or more groups, for example, for one or more TB MU UL OFDMA transmissions, e.g., as described below.

In some demonstrative embodiments, controller 124 may be configured to control, cause and/or trigger the STA implemented by device 102 to, based on a grouping criterion, select from a plurality STAs, e.g., devices 140, 160, 170 and/or 180, a group of two or more STAs for a TB MU UL OFDMA control frame transmission to be communicated from the group of STAs to device 102, e.g., as described below.

In one example, controller 124 may be configured to control, cause and/or trigger the STA implemented by device 102 to, based on the grouping criterion, select from the plurality STAs the group of the STAs implemented by devices 140 and 160 for the TB MU UL OFDMA control frame transmission to be communicated from the group of devices 140 and 160 to device 102, e.g., as described below.

In some demonstrative embodiments, the grouping criterion may be based, for example, on two or more RSSI values corresponding to the two or more STAs, respectively, e.g., as described below.

In one example, the grouping criterion may be based, for example, on a first RSSI value corresponding to device 140, and a second RSSI value corresponding to device 160.

In some demonstrative embodiments, controller 124 may be configured to control, cause and/or trigger the STA implemented by device 102 to transmit a trigger frame to trigger the TB MU UL OFDMA control frame transmission, e.g., as described below.

In one example, controller 124 may be configured to control, cause and/or trigger radio 114 and/or transmitter 118 to transmit the trigger frame, e.g., via antennas 107, for example, to trigger the TB MU UL OFDMA control frame transmission.

In some demonstrative embodiments, the trigger frame may include two or more STA Identifiers (IDs) to identify the two or more STAs, respectively, e.g., as described below.

In one example, the trigger frame may include a first ID to identify device 140, and a second ID to identify device 160.

In some demonstrative embodiments, controller 124 may be configured to control, cause and/or trigger the STA implemented by device 102 to process the TB MU UL OFDMA control frame transmission from the two or more STAs, e.g., as described below.

In one example, controller 124 may be configured to control, cause and/or trigger radio 114 and/or receiver 116 to process the TB MU UL OFDMA control frame transmission from devices 140 and 160.

In some demonstrative embodiments, the TB MU UL OFDMA control frame transmission may include two or more control frames from the two or more STAs, respectively. For example, the TB MU UL OFDMA control frame transmission may include a first control frame from device 140, and a second control frame from device 160.

In some demonstrative embodiments, the two or more control frames may include at least one of a Buffer Status Report (BSR), a Beamforming Report (BFR), a Bandwidth Query Report (BQR), a Null-Data Packet (NDP) Feedback Report (NFR), and/or any other additional or alternative control frame.

In some demonstrative embodiments, controller 124 may be configured to control, cause and/or trigger the STA implemented by device 102 to identify the plurality of STAs to be scheduled for UL control frame transmission, e.g., as described below.

In one example, controller 124 may identify devices 140, 160, 170 and 180 to be scheduled for the UL control frame transmission, e.g., as described below.

In some demonstrative embodiments, controller 124 may be configured to control, cause and/or trigger the STA implemented by device 102 to group the plurality of STAs into a plurality of STA groups, for example, based on the grouping criterion, e.g., as described below.

In one example, controller 124 may group a plurality of STAs including STAs implemented by devices 140, 160, 170 and 180 into a first group including devices 140 and 160, and a second group including devices 170 and 180, for example, based on the grouping criterion.

In some demonstrative embodiments, controller 124 may be configured to control, cause and/or trigger the STA implemented by device 102 to schedule a plurality of TB MU UL OFDMA control frame transmissions from the plurality of STA groups, respectively, e.g., as described below.

In one example, controller 124 may be configured to control, cause and/or trigger the STA implemented by device 102 to schedule a first TB MU UL OFDMA control frame transmission from the first group including devices 140 and 160, and a second TB MU UL OFDMA control frame transmissions from the second group including devices 170 and 180.

In some demonstrative embodiments, controller 124 may be configured to control, cause and/or trigger the STA implemented by device 102 to determine a sorted order of the plurality of STAs, e.g., according to RSSI values and/or any other grouping metric corresponding to the plurality of STAs; and to group the plurality of STAs into the plurality of STA groups based on the sorted order of the plurality of STAs, e.g., as described below.

In some demonstrative embodiments, the grouping criterion may include a similarity criterion, e.g., an RSSI similarity criterion, for example, corresponding to a similarity between the two or more RSSI values and/or any other grouping metric corresponding to the two or more STAs, e.g., as described below.

In some demonstrative embodiments, controller 124 may be configured to control, cause and/or trigger the STA implemented by device 102 to determine the group of two or more STAs to include N STAs, and to apply the grouping criterion to identify from the plurality of STAs the N STAs having RSSI values, which are closets to each other, e.g., as described below.

In some demonstrative embodiments, the grouping criterion may include an RSSI difference threshold, for example, such that a difference between a highest RSSI of the two or more RSSIs and a lowest RSSI of the two or more RSSIs of the STAs in the group may be less than the RSSI difference threshold, e.g., as described below.

In some demonstrative embodiments, device 102 may include a database (DB) 110 including a plurality of RSSI values corresponding to the plurality of STAs, respectively.

In some demonstrative embodiments, controller 124 may be configured to control, cause and/or trigger the STA implemented by device 102 to maintain the database 110 including the plurality of RSSI values corresponding to the plurality of STAs, respectively, and to identify whether a STA of the plurality of STAs is to be included in the group of two or more STA, for example, based on whether an RSSI value corresponding to the STA meets the grouping criterion, e.g., as described below.

In some demonstrative embodiments, controller 124 may be configured to control, cause and/or trigger the STA implemented by device 102 to dynamically update the database 110 to include dynamically updated RSSI values, for example, by dynamically updating an RSSI value corresponding to a STA based on a transmission received from the STA.

In some demonstrative embodiments, controller 124 may be configured to control, cause and/or trigger the STA implemented by device 102 to dynamically update the group of two or more STAs, for example, based on the dynamically updated RSSI values.

In one example, an AP, e.g., device 102, may be configured to access or retrieve RSSI information of a STA, which is stored in DB 110, for example, to quickly form UL groups, for example, to allow the AP to trigger STAs within the same group with a same or similar MCS parameters. For example, triggering the UL transmission for the group of STAs with the same or similar MCS parameters may be useful, for example, when the AP is triggering a report frame having a fixed size from the STAs, for example, to allow to reduce, e.g., minimize, an amount of zero padding in a TB HE PPDU.

In some demonstrative embodiments, the trigger frame may be configured to trigger the two or more control frames to have a same fixed size, e.g., as described below.

In some demonstrative embodiments, the trigger frame may include two or more MCS values for transmission of the two or more control frames, respectively, the two or more MCS values within a predefined MCS range, e.g., as described below.

In some demonstrative embodiments, the trigger frame may include two or more identical MCS values for transmission of the two or more control frames, respectively, e.g., as described below.

In some demonstrative embodiments, device 102 may be configured to determine a count of STAs to be included in a group of STAs for the TB MU UL OFDMA control frame transmission, e.g., as described below In some demonstrative embodiments, controller 124 may be configured to control, cause and/or trigger the STA implemented by device 102 to determine a count of STAs to be included in the group of two or more STAs for the TB MU UL OFDMA control frame transmission, for example, based on one or more parameters corresponding to the TB MU UL OFDMA control frame transmission, e.g., as described below.

In some demonstrative embodiments, controller 124 may be configured to control, cause and/or trigger the STA implemented by device 102 to determine the count of STAs to be included in the group of two or more STAs for the TB MU UL OFDMA control frame transmission, for example, based on a data size of the two or more control frames to be included in the TB MU UL OFDMA control frame transmission, e.g., as described below.

In some demonstrative embodiments, an AP, e.g., device 102, may be configured to optimize a size of UL groups for the TB MU UL OFDMA control frame transmissions. For example, the AP may be configured to determine a number of STAs within an UL group and their RU allocations, e.g., 2 MHz, 4 MHz, 20 MHz and the like, for example, to reduce, e.g., minimize an overall MAC-layer overhead and/or an overall duration of the TB MU UL OFDMA control frame transmission.

In one example, if the AP plans to schedule a large number of STAs with a small data size, then the AP may form large UL groups, for example, to reduce, e.g., minimize, a number of trigger frames, and/or to reduce, e.g., minimize, a number of trigger-based uplink PPDU transmissions.

In some demonstrative embodiments, grouping of the UL STAs, for example, based on the grouping criterion, e.g., RSSI-based UL STA grouping and/or based on any other grouping metric, may allow an AP, e.g., device 102, to quickly form UL STA groups for control frames, and/or may allow the AP to collect data, e.g., BSR frames, from STAs, for example, even without a need to form and/or manage UL data groups for "data" frame transmissions. For example, the UL STA groups for "control" frames may be different from the UL STA data groups for the "data" frame transmissions.

In one example, criteria for forming UL data groups for "data" frame transmissions may include, for example, achieving a fairness among STAs, a good packing efficiency by minimizing zero padding, and/or a good delay performance. Although UL STA grouping for "control" frames achieves the good packing efficiency, the criteria to form the UL STA groups for "control" frames may be different from the criteria to form the UL STA data groups.

In some demonstrative embodiments, device 102 may be configured to define a group for TB MU UL OFDMA control frame transmission, for example, based on any other additional or alternative grouping criterion, which is not based on RSSI values, e.g., as described below.

In some demonstrative embodiments, the grouping criterion may be based, for example, on a size criterion configured to identify whether a STA is to be included in the group of two or more STAs, for example, based on a size of a control frame from the STA to be included in the TB MU UL OFDMA control frame transmission, e.g., as described below.

In some demonstrative embodiments, the grouping criterion may be based, for example, on a scheduling criterion configured to identify whether a STA is to be included in the group of two or more STAs, for example, based on a frequency of scheduling UL transmissions from the STA, e.g., as described below.

In some demonstrative embodiments, the grouping criterion may be based, for example, on a Quality of Service (QoS) criterion configured to identify whether a STA is to be included in the group of two or more STAs, for example, based on a QoS requirement for a traffic flow of the STA, e.g., as described below.

In one example, an AP, e.g., device 102, may be configured to use other performance metrics, e.g., in addition to or instead of the RSSI values, for example, based on metrics, which may be more suitable for performance optimization. For example, other potential metrics may include QoS requirements, frequency of UL scheduling, size of a BFR frame, e.g., when triggering Beamforming reports, frequency selective fading channel information in the database of the AP and/or any other additional or alternative performance metrics.

For example, an AP, e.g., device 102, may use the QoS requirements for the traffic flow of the STA, and group STAs with a higher QoS requirement together, for example, for more frequent probing for their BSR frames, which meet their higher QoS requirement.

Figure 2:
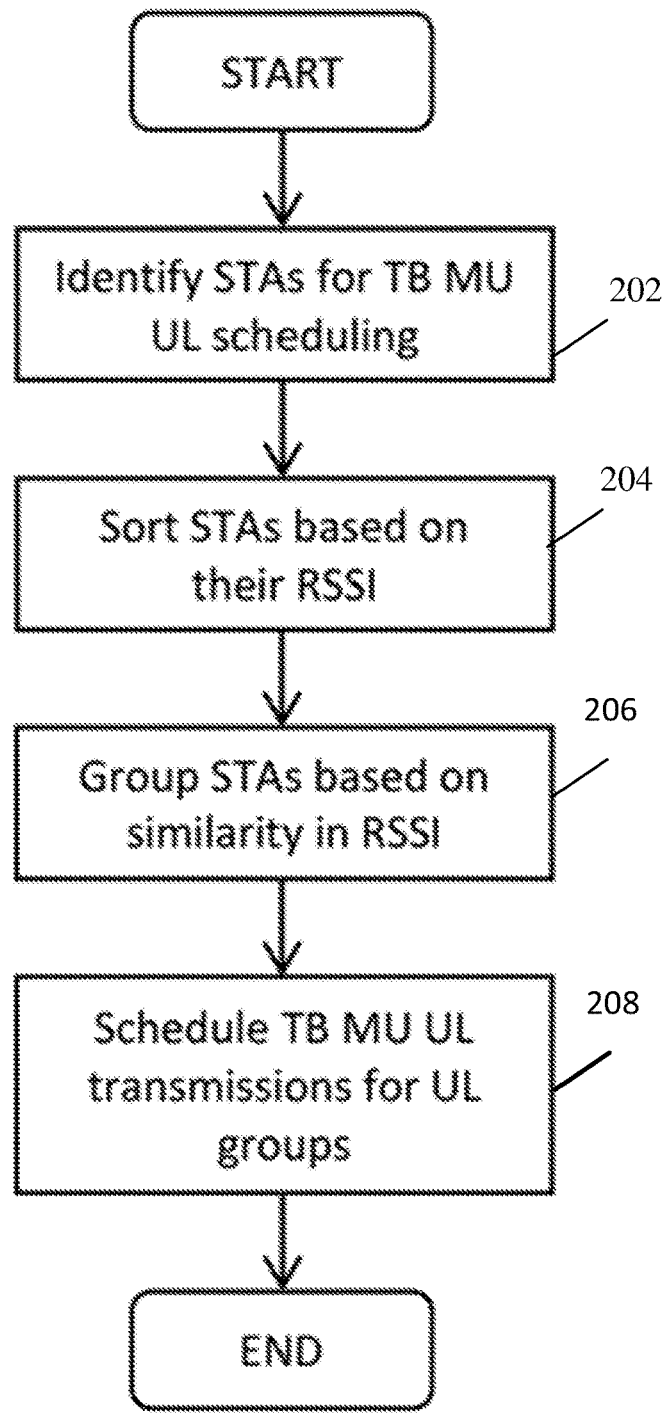
FIG. 2 is a schematic flow-chart illustration of a method of Trigger-Based (TB) Multi-User (MU) Uplink (UL) Orthogonal Frequency Division Multiple Access (OFDMA) transmission, in accordance with some demonstrative embodiments.

Reference is made to FIG. 2, which schematically illustrates a method of TB MU UL OFDMA transmission, in accordance with some demonstrative embodiments. For example, one or more of the operations of the method of FIG. 2 may be performed by a wireless communication system, e.g., system 100 (FIG. 1); a wireless communication device, e.g., device 102 (FIG. 1); a controller, e.g., controller 124 (FIG. 1); a radio, e.g., radio 114 (FIG. 1); a message processor, e.g., message processor 128 (FIG. 1); a transmitter, e.g., transmitter 118 (FIG. 1); and/or a receiver, e.g., receiver 116 (FIG. 1).

In some demonstrative embodiments, as indicated at block 202, the method may include identifying a plurality of STAs to be scheduled for TB UL control frame transmission.

In one example, an AP, e.g., device 102 (FIG. 1), may be configured to identify devices 140, 160, and 180 (FIG. 1), for the TB UL control frame transmission, e.g., as described above.

In some demonstrative embodiments, as indicated at block 204, the method may include sorting the plurality of STAs to be scheduled for the UL control frame transmission, for example, based on RSSI values corresponding to the plurality of STAs. For example, an AP, e.g., device 102 (FIG. 1), may be configured to sort devices 140, 160, and 180 (FIG. 1), for example, based on their RSSI values, which may be stored in DB 110 (FIG. 1), e.g., as described above.

In some demonstrative embodiments, as indicated at block 206, the method may include grouping the plurality of STAs into a plurality of UL STA groups, for example, by grouping two or more STA of the plurality of STAs into an UL STA group, for example, based on similarity in their RSSI values. For example, an AP, e.g., device 102 (FIG. 1), may be configured to group devices 140 and 160 into an UL STA group, for example, if their RSSI values are similar, e.g., as described above.

In some demonstrative embodiments, as indicated at block 208, the method may include scheduling TB UL control frame transmissions for the plurality of UL STA groups. For example, an AP, e.g., device 102 (FIG. 1), may be configured to schedule a TB UL control frame transmission for the UL STA group including devices 140 and 160, e.g., as described above.

Figure 3:
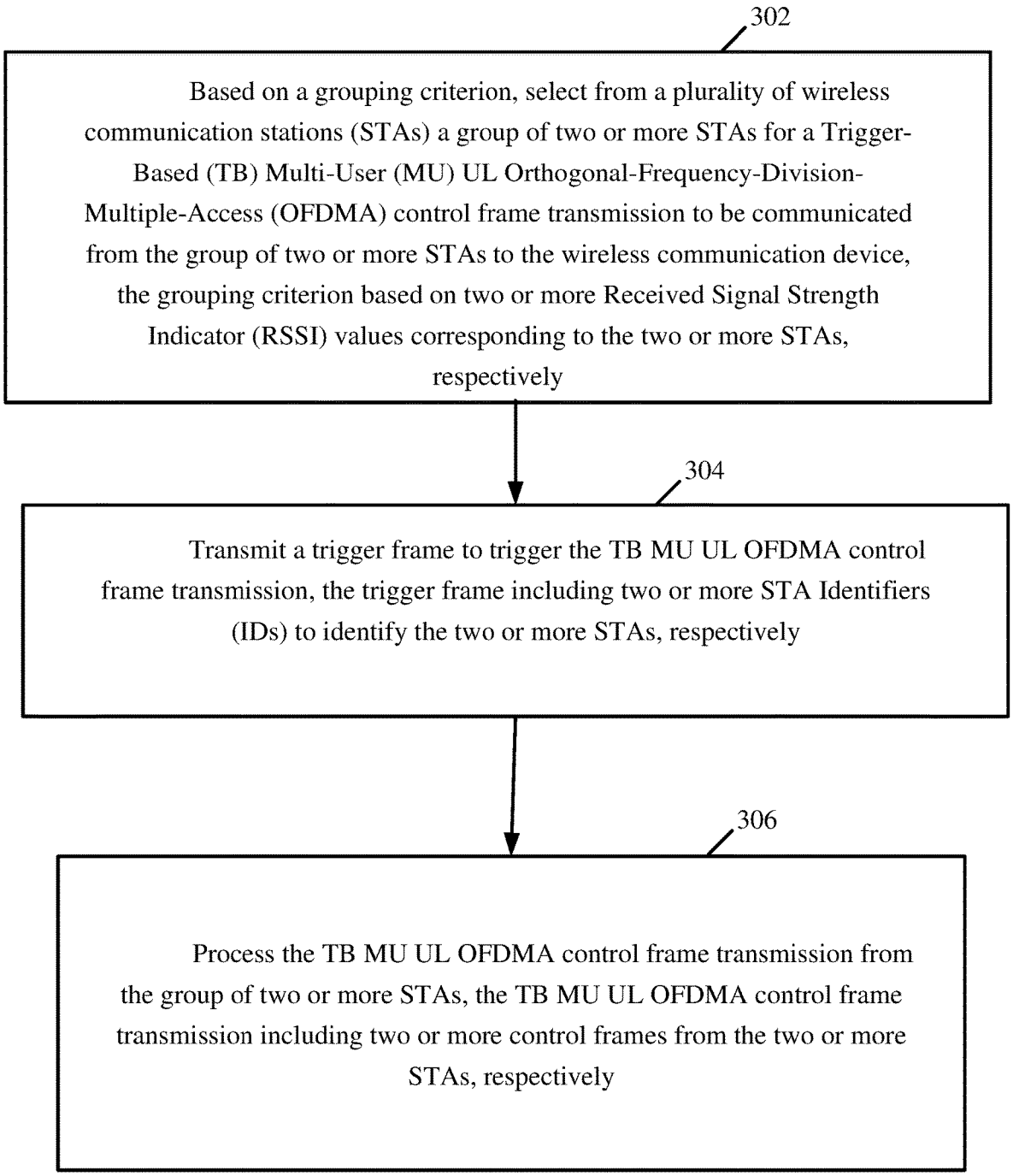
FIG. 3 is a schematic flow-chart illustration of a method of TB MU UL OFDMA transmission, in accordance with some demonstrative embodiments.

Reference is made to FIG. 3, which schematically illustrates a method of TB MU UL OFDMA control frame transmission, in accordance with some demonstrative embodiments. For example, one or more of the operations of the method of FIG. 3 may be performed by a wireless communication system, e.g., system 100 (FIG. 1); a wireless communication device, e.g., device 102 (FIG. 1); a controller, e.g., controller 124 (FIG. 1); a radio, e.g., radio 114 (FIG. 1); a message processor, e.g., message processor 128 (FIG. 1); a transmitter, e.g., transmitter 118 (FIG. 1); and/or a receiver, e.g., receiver 116 (FIG. 1).

As indicated at block 302, the method may include selecting at a wireless communication device a group of two or more STAs from a plurality of STAs for a TB MU OFDMA control frame transmission to be communicated from the group of two or more STAs to the wireless communication device, e.g., based on a grouping criterion. For example, the grouping criterion may be based on two or more RSSI values corresponding to the two or more STAs, respectively. For example, controller 124 (FIG. 1) may control, cause and/or trigger the STA implemented by device 102 (FIG. 1) to, based on a grouping criterion, select from the plurality of STAs 140, 160, 170 and/or 180 (FIG. 1) the group of devices 140 and 160 (FIG. 1) for the TB MU OFDMA control frame transmission to be communicated from the group of devices 140 and 160 (FIG. 1) to device 102 (FIG. 1), the grouping criterion may be based on the RSSI values corresponding to devices 140 and 160 (FIG. 1), respectively, e.g., as described above.

As indicated at block 304, the method may include transmitting a trigger frame to trigger the TB MU UL OFDMA control frame transmission, the trigger frame may include two or more STA Identifiers (IDs) to identify the two or more STAs, respectively. For example, controller 124 (FIG. 1) may control, cause and/or trigger the STA implemented by device 102 (FIG. 1) to transmit the trigger frame to trigger the TB MU UL OFDMA control frame transmission, the trigger frame including the IDs to identify devices 140 and 160 (FIG. 1), respectively, e.g., as described above.

As indicated at block 306, the method may include processing the TB MU UL OFDMA control frame transmission from the group of two or more STAs, the TB MU UL OFDMA control frame transmission including two or more control frames from the two or more STAs, respectively. For example, controller 124 (FIG. 1) may control, cause and/or trigger the STA implemented by device 102 (FIG. 1) to process the TB MU UL OFDMA control frame transmission from the group of devices 140 and 160 (FIG. 1), the TB MU UL OFDMA control frame transmission may include two or more control frames from devices 140 and 160 (FIG. 1), respectively, e.g., as described above.

Figure 4:
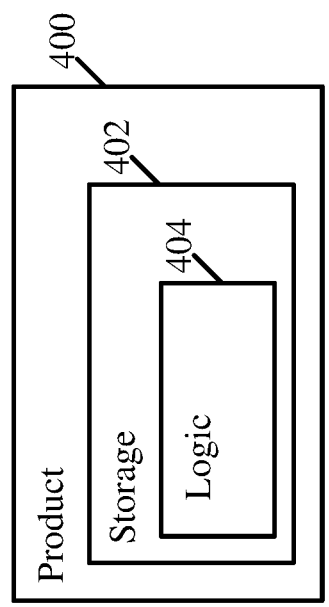
FIG. 4 is a schematic illustration of a product of manufacture, in accordance with some demonstrative embodiments.

Reference is made to FIG. 4, which schematically illustrates a product of manufacture 400, in accordance with some demonstrative embodiments. Product 400 may include one or more tangible computer-readable ("machine readable") non-transitory storage media 402, which may include computer-executable instructions, e.g., implemented by logic 404, operable to, when executed by at least one processor, e.g., computer processor, enable the at least one processor to implement one or more operations at devices 102, 140, 160, 170 and/or 180 (FIG. 1), radio 114 (FIG. 1), transmitter 118 (FIG. 1), receiver 116 (FIG. 1), controller 124 (FIG. 1), and/or message processor 128 (FIG. 1), to cause devices 102, 140, 160, 170 and/or 180 (FIG. 1), radio 114 (FIG. 1), transmitter 118 (FIG. 1), receiver 116 (FIG. 1), controller 124 (FIG. 1), and/or message processor 128 (FIG. 1) to perform one or more operations, and/or to perform, trigger and/or implement one or more operations, communications and/or functionalities described above with reference to FIGS. 1, 2, and/or 3, and/or one or more operations described herein. The phrases "non-transitory machine-readable media (medium)" and "computer-readable non-transitory storage media (medium)" are directed to include all computer-readable media, with the sole exception being a transitory propagating signal.

In some demonstrative embodiments, product 400 and/or storage media 402 may include one or more types of computer-readable storage media capable of storing data, including volatile memory, non-volatile memory, removable or non-removable memory, erasable or non-erasable memory, writeable or re-writeable memory, and the like. For example, storage media 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless communication device to, based on a grouping criterion, select from a plurality of wireless communication stations (STAs) a group of two or more STAs for a Trigger-Based (TB) Multi-User (MU) UL Orthogonal-Frequency-Division-Multiple-Access (OFDMA) control frame transmission to be communicated from the group of two or more STAs to the wireless communication device, the grouping criterion based on two or more Received Signal Strength Indicator (RSSI) values corresponding to the two or more STAs, respectively; transmit a trigger frame to trigger the TB MU UL OFDMA control frame transmission, the trigger frame comprising two or more STA Identifiers (IDs) to identify the two or more STAs, respectively; and process the TB MU UL OFDMA control frame transmission from the group of two or more STAs, the TB MU UL OFDMA control frame transmission comprising two or more control frames from the two or more STAs, respectively.

Example 2 includes the subject matter of Example 1, and optionally, wherein the apparatus is configured to cause the wireless communication device to identify the plurality of STAs to be scheduled for UL control frame transmission; group the plurality of STAs into a plurality of STA groups based on the grouping criterion; and schedule a plurality of TB MU UL OFDMA control frame transmissions from the plurality of STA groups, respectively.

Example 3 includes the subject matter of Example 2, and optionally, wherein the apparatus is configured to cause the wireless communication device to determine a sorted order of the plurality of STAs according to RSSI values of the plurality of STAs, and to group the plurality of STAs into the plurality of STA groups based on the sorted order of the plurality of STAs.

Example 4 includes the subject matter of any one of Examples 1-3, and optionally, wherein the grouping criterion comprises an RSSI similarity criterion corresponding to a similarity between the two or more RSSI values corresponding to the two or more STAs.

Example 5 includes the subject matter of any one of Examples 1-4, and optionally, wherein the apparatus is configured to cause the wireless communication device to determine the group of two or more STAs to include N STAs, and to apply the grouping criterion to identify from the plurality of STAs the N STAs having RSSI values which are closets to each other.

Example 6 includes the subject matter of any one of Examples 1-5, and optionally, wherein the grouping criterion comprises an RSSI difference threshold, a difference between a highest RSSI of the two or more RSSIs and a lowest RSSI of the two or more RSSIs is less than the RSSI difference threshold Example 7 includes the subject matter of any one of Examples 1-6, and optionally, wherein the trigger frame comprises two or more Modulation and Coding Scheme (MCS) values for transmission of the two or more control frames, respectively, the two or more MCS values within a predefined MCS range.

Example 8 includes the subject matter of any one of Examples 1-7, and optionally, wherein the trigger frame comprises two or more identical Modulation and Coding Scheme (MCS) values for transmission of the two or more control frames, respectively.

Example 9 includes the subject matter of any one of Examples 1-8, and optionally, wherein the trigger frame is configured to trigger the two or more control frames to have a same fixed size.

Example 10 includes the subject matter of any one of Examples 1-9, and optionally, wherein the apparatus is configured to cause the wireless communication device to determine a count of STAs to be included in the group of two or more STAs based on one or more parameters corresponding to the TB MU UL OFDMA control frame transmission.

Example 11 includes the subject matter of any one of Examples 1-10, and optionally, wherein the apparatus is configured to cause the wireless communication device to determine a count of STAs to be included in the group of two or more STAs based on a data size of the two or more control frames to be included in the TB MU UL OFDMA control frame transmission.

Example 12 includes the subject matter of any one of Examples 1-11, and optionally, wherein the apparatus is configured to cause the wireless communication device to maintain a database comprising a plurality of RSSI values corresponding to the plurality of STAs, respectively, and to identify whether a STA of the plurality of STAs is to be included in the group of two or more STA based on whether an RSSI value corresponding to the STA meets the grouping criterion.

Example 13 includes the subject matter of Example 12, and optionally, wherein the apparatus is configured to cause the wireless communication device to dynamically update the database to comprise dynamically updated RSSI values by dynamically updating an RSSI value corresponding to a STA based on a transmission received from the STA, and to dynamically update the group of two or more STAs based on the dynamically updated RSSI values.

Example 14 includes the subject matter of any one of Examples 1-13, and optionally, wherein the grouping criterion is based on a Quality of Service (QoS) criterion configured to identify whether a STA is to be included in the group of two or more STAs based on a QoS requirement for a traffic flow of the STA.

Example 15 includes the subject matter of any one of Examples 1-14, and optionally, wherein the grouping criterion is based on a scheduling criterion configured to identify whether a STA is to be included in the group of two or more STAs based on a frequency of scheduling UL transmissions from the STA.

Example 16 includes the subject matter of any one of Examples 1-15, and optionally, wherein the grouping criterion is based on a size criterion configured to identify whether a STA is to be included in the group of two or more STAs based on a size of a control frame from the STA to be included in the TB MU UL OFDMA control frame transmission.

Example 17 includes the subject matter of any one of Examples 1-16, and optionally, wherein the two or more control frames comprise at least one of a Buffer Status Report (BSR), a Beamforming Report (BFR), a Bandwidth Query Report (BQR), or a Null-Data Packet (NDP) Feedback Report (NFR).

Example 18 includes the subject matter of any one of Examples 1-17, and optionally, wherein the wireless communication device is an Access Point (AP).

Example 19 includes the subject matter of any one of Examples 1-18, and optionally, comprising a radio to transmit the trigger frame, and to receive the TB MU UL OFDMA control frame transmission.

Example 20 includes the subject matter of Example 19, and optionally, comprising one or more antennas connected to the radio, a memory to store data processed by the wireless communication device, and a processor to execute instructions of an operating system.

Example 21 comprises an apparatus comprising means for executing any of the described operations of Examples 1-20.

Example 22 comprises a machine-readable medium that stores instructions for execution by a processor to perform any of the described operations of Examples 1-20.

Example 23 comprises an apparatus comprising: a memory interface; and processing circuitry configured to: perform any of the described operations of Examples 1-20.

Example 24 comprises a method to perform any of the described operations of Examples 1-20.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication device to:
   group a plurality of wireless communication stations (STAs) into a first plurality of STA groups for Trigger-Based (TB) Multi-User (MU) Uplink (UL) Orthogonal-Frequency-Division-Multiple-Access (OFDMA) control frame transmissions based on an UL control frame grouping criterion, wherein grouping the plurality of STAs into the first plurality of STA groups comprises selecting from the plurality of STAs a group of two or more STAs for a TB MU UL OFDMA control frame transmission to be communicated from the group of two or more STAs to the wireless communication device, wherein the UL control frame grouping criterion is based on at least one of a Quality of Service (QOS) criterion, a scheduling criterion, or a size criterion, wherein the QoS criterion is to identify whether a STA is to be included in the group of two or more STAs based on a QoS requirement for a traffic flow of the STA, the scheduling criterion to identify whether the STA is to be included in the group of two or more STAs based on a frequency of scheduling UL transmissions from the STA, the size criterion to identify whether the STA is to be included in the group of two or more STAs based on a size of a control frame from the STA to be included in the TB MU UL OFDMA control frame transmission;
   group the plurality of STAs into a second plurality of STA groups for UL data frame transmissions based on an UL data frame grouping criterion, wherein the UL control frame grouping criterion is different from the UL data frame grouping criterion, wherein the second plurality of STA groups is different from the first plurality of STA groups;
   transmit a trigger frame to trigger the TB MU UL OFDMA control frame transmission, the trigger frame comprising two or more STA Identifiers (IDs) to identify the two or more STAs, respectively; and process the TB MU UL OFDMA control frame transmission from the group of two or more STAs, the TB MU UL OFDMA control frame transmission comprising two or more control frames from the two or more STAs, respectively, wherein the two or more control frames comprise at least one of a Buffer Status Report (BSR), a Beamforming Report (BFR), a Bandwidth Query Report (BQR), or a Null-Data Packet (NDP) Feedback Report (NFR).

2. The apparatus of claim 1 configured to cause the wireless communication device to:

schedule a plurality of TB MU UL OFDMA control frame transmissions from the first plurality of STA groups, respectively.

3. The apparatus of claim 1 configured to cause the wireless communication device to determine a sorted order of the plurality of STAs according to Received Signal Strength Indicator (RSSI) values of the plurality of STAs, and to group the plurality of STAs into the first plurality of STA groups based on the sorted order of the plurality of STAs.

4. The apparatus of claim 1, wherein the UL control frame grouping criterion comprises a Received Signal Strength Indicator (RSSI) RSSI similarity criterion corresponding to a similarity between two or more RSSI values corresponding to the two or more STAs.

5. The apparatus of claim 1 configured to cause the wireless communication device to determine the group of two or more STAs to include N STAs, and to apply the UL control frame grouping criterion to identify from the plurality of STAs the N STAs having Received Signal Strength Indicator (RSSI) values which are closest to each other.

6. The apparatus of claim 1, wherein the UL control frame grouping criterion comprises a Received Signal Strength Indicator (RSSI) difference threshold, wherein a difference between a highest RSSI value of two or more RSSI values corresponding to the two or more STAs and a lowest RSSI value of the two or more RSSI values is less than the RSSI difference threshold.

7. The apparatus of claim 1, wherein the trigger frame comprises two or more Modulation and Coding Scheme (MCS) values for transmission of the two or more control frames, respectively, the two or more MCS values within a predefined MCS range.

8. The apparatus of claim 1, wherein the trigger frame comprises two or more identical Modulation and Coding Scheme (MCS) values for transmission of the two or more control frames, respectively.

9. The apparatus of claim 1, wherein the trigger frame is configured to trigger the two or more control frames to have a same fixed size.

10. The apparatus of claim 1 configured to cause the wireless communication device to determine a count of STAs to be included in the group of two or more STAs based on one or more parameters corresponding to the TB MU UL OFDMA control frame transmission.

11. The apparatus of claim 1 configured to cause the wireless communication device to determine a count of STAs to be included in the group of two or more STAs based on a data size of the two or more control frames to be included in the TB MU UL OFDMA control frame transmission.

12. The apparatus of claim 1 configured to cause the wireless communication device to maintain a database comprising a plurality of Received Signal Strength Indicator (RSSI) values corresponding to the plurality of STAs, respectively, and to identify whether the STA is to be included in the group of two or more STAs based on whether an RSSI value corresponding to the STA meets the UL control frame grouping criterion.

13. The apparatus of claim 12 configured to cause the wireless communication device to dynamically update the database to comprise dynamically updated RSSI values by dynamically updating the RSSI value corresponding to the STA based on a transmission received from the STA, and to dynamically update the group of two or more STAs based on the dynamically updated RSSI values.

14. The apparatus of claim 1, wherein the UL control frame grouping criterion is based on two or more Received Signal Strength Indicator (RSSI) values corresponding to the two or more STAs, respectively.

15. The apparatus of claim 1 comprising a radio to transmit the trigger frame, and to receive the TB MU UL OFDMA control frame transmission, one or more antennas connected to the radio, a memory to store data processed by the wireless communication device, and a processor to execute instructions of an operating system.

16. A product comprising one or more tangible computer-readable non-transitory storage media comprising computer-executable instructions operable to, when executed by at least one processor, enable the at least one processor to cause a wireless communication device to:

group a plurality of wireless communication stations (STAs) into a first plurality of STA groups for Trigger-Based (TB) Multi-User (MU) Uplink (UL) Orthogonal-Frequency-Division-Multiple-Access (OFDMA) control frame transmissions based on an UL control frame grouping criterion, wherein grouping the plurality of STAs into the first plurality of STA groups comprises selecting from the plurality of STAs a group of two or more STAs for a TB MU UL OFDMA control frame transmission to be communicated from the group of two or more STAs to the wireless communication device, wherein the UL control frame grouping criterion is based on at least one of a Quality of Service (QOS) criterion, a scheduling criterion, or a size criterion, wherein the QoS criterion is to identify whether a STA is to be included in the group of two or more STAs based on a QoS requirement for a traffic flow of the STA, the scheduling criterion to identify whether the STA is to be included in the group of two or more STAs based on a frequency of scheduling UL transmissions from the STA, the size criterion to identify whether the STA is to be included in the group of two or more STAs based on a size of a control frame from the STA to be included in the TB MU UL OFDMA control frame transmission;

group the plurality of STAs into a second plurality of STA groups for UL data frame transmissions based on an UL data frame grouping criterion, wherein the UL control frame grouping criterion is different from the UL data frame grouping criterion, wherein the second plurality of STA groups is different from the first plurality of STA groups;

transmit a trigger frame to trigger the TB MU UL OFDMA control frame transmission, the trigger frame comprising two or more STA Identifiers (IDs) to identify the two or more STAs, respectively; and process the TB MU UL OFDMA control frame transmission from the group of two or more STAs, the TB MU UL OFDMA control frame transmission comprising two or more control frames from the two or more STAs, respectively, wherein the two or more control frames comprise at least one of a Buffer Status Report (BSR), a Beamforming Report (BFR), a Bandwidth Query Report (BQR), or a Null-Data Packet (NDP) Feedback Report (NFR).

17. The product of claim 16, wherein the UL control frame grouping criterion is based on two or more Received Signal Strength Indicator (RSSI) values corresponding to the two or more STAs, respectively.

18. The product of claim 17, wherein the UL control frame grouping criterion comprises an RSSI similarity criterion corresponding to a similarity between the two or more RSSI values corresponding to the two or more STAs.

19. The product of claim 16, wherein the instructions, when executed, cause the wireless communication device to maintain a database comprising a plurality of Received Signal Strength Indicator (RSSI) values corresponding to the plurality of STAs, respectively, and to identify whether the STA is to be included in the group of two or more STAs based on whether an RSSI value corresponding to the STA meets the UL control frame grouping criterion.

20. An apparatus of a wireless communication device, the apparatus comprising:
 means for grouping a plurality of wireless communication stations (STAs) into a first plurality of STA groups for Trigger-Based (TB) Multi-User (MU) Uplink (UL) Orthogonal-Frequency-Division-Multiple-Access (OFDMA) control frame transmissions based on an UL control frame grouping criterion, wherein grouping the plurality of STAs into the first plurality of STA groups comprises selecting from the plurality of STAs a group of two or more STAs for a TB MU UL OFDMA control frame transmission to be communicated from the group of two or more STAs to the wireless communication device, wherein the UL control frame grouping criterion is based on at least one of a Quality of Service (QoS) criterion, a scheduling criterion, or a size criterion, wherein the QoS criterion is to identify whether a STA is to be included in the group of two or more STAs based on a QoS requirement for a traffic flow of the STA, the scheduling criterion to identify whether the STA is to be included in the group of two or more STAs based on a frequency of scheduling UL transmissions from the STA, the size criterion to identify whether the STA is to be included in the group of two or more STAs based on a size of a control frame from the STA to be included in the TB MU UL OFDMA control frame transmission;
 means for grouping the plurality of STAs into a second plurality of STA groups for UL data frame transmissions based on an UL data frame grouping criterion, wherein the UL control frame grouping criterion is different from the UL data frame grouping criterion, wherein the second plurality of STA groups is different from the first plurality of STA groups;
 means for causing the wireless communication device to transmit a trigger frame to trigger the TB MU UL OFDMA control frame transmission, the trigger frame comprising two or more STA Identifiers (IDs) to identify the two or more STAs, respectively; and
 means for processing the TB MU UL OFDMA control frame transmission from the group of two or more STAs, the TB MU UL OFDMA control frame transmission comprising two or more control frames from the two or more STAs, respectively, wherein the two or more control frames comprise at least one of a Buffer Status Report (BSR), a Beamforming Report (BFR), a Bandwidth Query Report (BQR), or a Null-Data Packet (NDP) Feedback Report (NFR).

21. The apparatus of claim 20, wherein the UL control frame grouping criterion is based on two or more Received Signal Strength Indicator (RSSI) values corresponding to the two or more STAs, respectively.

* * * * *